United States Patent
Ahn et al.

(10) Patent No.: US 10,970,565 B2
(45) Date of Patent: Apr. 6, 2021

(54) METHOD AND APPARATUS WITH ROAD LINE DETECTION

(71) Applicant: Samsung Electronics Co., Ltd., Suwon-si (KR)

(72) Inventors: Minsu Ahn, Yongin-si (KR); Jiyeon Kim, Hwaseong-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 132 days.

(21) Appl. No.: 16/259,066

(22) Filed: Jan. 28, 2019

(65) Prior Publication Data

US 2020/0082178 A1    Mar. 12, 2020

(30) Foreign Application Priority Data

Sep. 7, 2018  (KR) .......................... 10-2018-0107070

(51) Int. Cl.
*G06K 9/00* (2006.01)
*G06T 7/187* (2017.01)
*G06T 7/11* (2017.01)

(52) U.S. Cl.
CPC ............ *G06K 9/00798* (2013.01); *G06T 7/11* (2017.01); *G06T 7/187* (2017.01); *G06T 2207/30256* (2013.01)

(58) Field of Classification Search
CPC ....... G06K 9/00798; G06T 7/187; G06T 7/11; G06T 2207/30256
See application file for complete search history.

(56) References Cited

U.S. PATENT DOCUMENTS

| 6,493,458 B2* | 12/2002 | Yasui | G05D 1/0246 |
| | | | 382/104 |
| 2002/0031242 A1* | 3/2002 | Yasui | G06K 9/00798 |
| | | | 382/104 |
| 2013/0266186 A1* | 10/2013 | Zhang | G06K 9/00798 |
| | | | 382/104 |

(Continued)

FOREIGN PATENT DOCUMENTS

| JP | 2001076147 A | * | 3/2001 | ......... G06K 9/00798 |
| JP | 2009-75938 A | | 4/2009 | |

(Continued)

OTHER PUBLICATIONS

Graph Spectral Motion Segmentation Based on Motion Vanishing Point Analysis (Year: 2015).*

(Continued)

*Primary Examiner* — Nizar N Sivji
(74) *Attorney, Agent, or Firm* — NSIP Law

(57) ABSTRACT

Disclosed is a method and apparatus for detecting a road line includes segmenting a driving image data into a plurality of segmentation areas, determining a candidate vanishing-point area corresponding to a segmentation area of the segmentation areas, extracting at least one straight road line from the segmentation area, detecting a partial line corresponding to the segmentation area based on whether the at least one straight road line meets the candidate vanishing-point area, detecting the road line of the driving image data by connecting partial lines corresponding to the segmentation areas, and indicating the detected road line.

19 Claims, 12 Drawing Sheets

(56) References Cited

U.S. PATENT DOCUMENTS

| | | | | |
|---|---|---|---|---|
| 2014/0063252 | A1* | 3/2014 | Zhao | G06T 7/80 |
| | | | | 348/148 |
| 2015/0248771 | A1* | 9/2015 | Kim | G06T 7/12 |
| | | | | 382/169 |
| 2016/0350603 | A1* | 12/2016 | Suddamalla | G06K 9/4604 |
| 2017/0177951 | A1 | 6/2017 | Yang et al. | |
| 2018/0060677 | A1 | 3/2018 | Bai et al. | |
| 2018/0150700 | A1 | 5/2018 | Kaneko et al. | |
| 2018/0197021 | A1* | 7/2018 | Lee | G06K 9/00798 |
| 2018/0247139 | A1* | 8/2018 | Kaneko | G08G 1/167 |
| 2018/0284798 | A1* | 10/2018 | Kita | G06K 9/00798 |
| 2020/0064855 | A1* | 2/2020 | Ji | G05D 1/0214 |

FOREIGN PATENT DOCUMENTS

| | | |
|---|---|---|
| JP | 2013-234902 A | 11/2013 |
| JP | 2014-107697 A | 6/2014 |
| JP | 2014-232439 A | 12/2014 |
| KR | 10-2011-0111668 A | 10/2011 |
| KR | 10-2013-0015984 A | 2/2013 |
| KR | 10-2015-0050233 A | 5/2015 |
| KR | 10-2015-0090787 A | 8/2015 |
| KR | 10-2015-0102546 A | 9/2015 |
| KR | 10-2018-0033762 A | 4/2018 |

OTHER PUBLICATIONS

Road Area Detection based on Image Segmentation and Contour Feature (Year: 2013).*

Vision-Based Road Detection by Adaptive Region Segmentation and Edge Constraint (Year: 2008).*

* cited by examiner

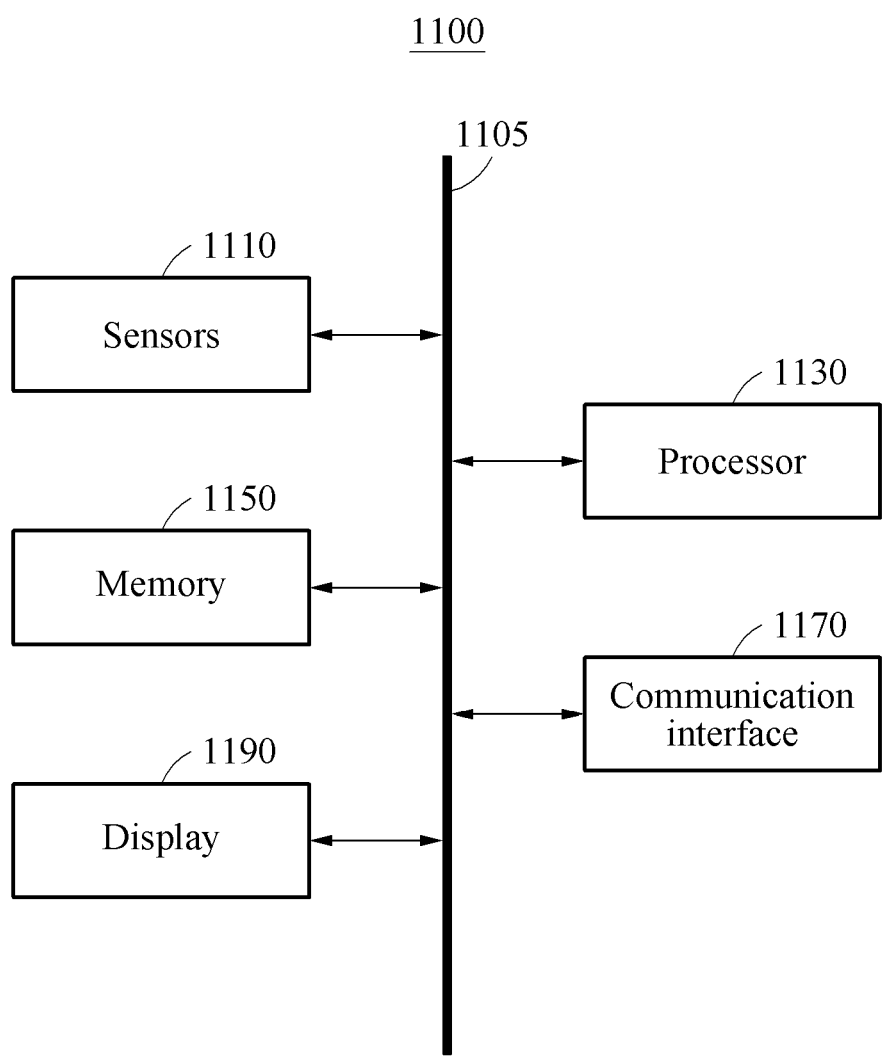

METHOD AND APPARATUS WITH ROAD LINE DETECTION

CROSS-REFERENCE TO RELATED APPLICATIONS

This application claims the benefit under 35 USC § 119(a) of Korean Patent Application No. 10-2018-0107070 filed on Sep. 7, 2018 in the Korean Intellectual Property Office, the entire disclosure of which is incorporated herein by reference for all purposes.

BACKGROUND

1. Field

The following description relates to a method and an apparatus with road line detection.

2. Description of Related Art

Visual information augmentation technologies are provided to assist steering of a vehicle and other transportation means. In such technology, various methods are used to extract a lane marking or road information from a driving image data.

In general, when a line is a straight road line and a road is on a plane, the line may be extracted by filtering straight road lines passing through a vanishing point in an image based on the vanishing point. However, when a line is a curved road line and a road is not on a plane, a plurality of vanishing points may appear in an image, which may lead to a difficulty in extracting the line.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented method of detecting a road line, includes segmenting a driving image data into a plurality of segmentation areas, determining a candidate vanishing-point area corresponding to a segmentation area of the segmentation areas, extracting at least one straight road line from the segmentation area, detecting a partial line corresponding to the segmentation area based on whether the at least one straight road line meets the candidate vanishing-point area, detecting the road line of the driving image data by connecting partial lines corresponding to the segmentation areas; and indicating the detected road line.

The determining of the candidate vanishing-point area may include verifying whether the segmentation area is a lowermost segmentation area of the driving image data, and determining the candidate vanishing-point area based on a verification result.

The determining of the candidate vanishing-point area based on the verification result may include extracting, when the segmentation area is the lowermost segmentation area, a candidate vanishing-point area corresponding to the segmentation area irrespective of a preceding segmentation area adjacent to the segmentation area.

The determining of the candidate vanishing-point area based on the verification result may include extracting, when the segmentation area is not the lowermost segmentation area, a candidate vanishing-point area corresponding to the segmentation area based on a partial vanishing point determined in a preceding segmentation area adjacent to the segmentation area.

The extracting of the candidate vanishing-point area may include defining a bounding box having a predetermined distance from the partial vanishing point determined in the preceding segmentation area, and extracting the candidate vanishing-point area using the bounding box.

The extracting of the candidate vanishing-point area may include extracting a candidate vanishing-point area corresponding to the segmentation area based on the partial vanishing point determined in the preceding segmentation area and a driving parameter corresponding to the driving image data.

The segmenting may include segmenting the driving image data into the segmentation areas horizontally while moving from a lowermost position toward a top of the driving image data.

The extracting of the at least one straight road line may include extracting a line detection area from the segmentation area, and extracting the at least one straight road line from the line detection area.

The extracting of the line detection area may include extracting the line detection area based on a partial vanishing point corresponding to a preceding segmentation area of the segmentation area and a partial line corresponding to the preceding segmentation area.

The detecting of the partial line may include determining a partial vanishing point corresponding to the segmentation area based on whether the at least one straight road line meets the candidate vanishing-point area, and detecting a partial line corresponding to the segmentation area based on the partial vanishing point.

The detecting of the partial line may include detecting a straight road line passing through the partial vanishing point among the at least one straight road line as the partial line.

The detecting of the partial line may include detecting the partial line corresponding to the segmentation area based on whether the partial line is a continuation of a partial line corresponding to a preceding segmentation area of the segmentation area.

In another general aspect, a processor-implemented method of detecting a road line, includes segmenting a driving image data into a plurality of segmentation areas, determining a candidate vanishing-point area corresponding to a segmentation area of the segmentation areas based on a partial vanishing point corresponding to a segmentation area adjacent to the segmentation area, determining a line detection area corresponding to the segmentation area based on a partial line corresponding to the adjacent segmentation area and the partial vanishing point, extracting at least one straight road line from the line detection area, detecting a partial line corresponding to the segmentation area based on whether the at least one straight road line meets the candidate vanishing-point area, detecting the road line of the driving image data by connecting partial lines corresponding to the segmentation areas, and indicating the detected road line.

The determining of the candidate vanishing-point area may include extracting a candidate vanishing-point area corresponding to the segmentation area based on the partial vanishing point corresponding to the adjacent segmentation area and a driving parameter corresponding to the driving image data.

The extracting of the at least one straight road line may include extracting the line detection area from the segmentation area, and extracting the at least one straight road line from the line detection area.

The extracting of the line detection area may include extracting the line detection area based on the partial vanishing point corresponding to the adjacent segmentation area and a partial line corresponding to the adjacent segmentation area.

The detecting of the partial line may include determining a partial vanishing point corresponding to the segmentation area based on whether the at least one straight road line meets the candidate vanishing-point area, and detecting the partial line corresponding to the segmentation area based on the partial vanishing point.

The detecting of the partial line may include detecting a straight road line passing through the partial vanishing point among the at least one straight road line as the partial line.

The detecting of the partial line may include detecting the partial line corresponding to the segmentation area based on whether the partial line is a continuation of a partial line corresponding to a preceding segmentation area of the segmentation area.

A non-transitory computer-readable storage medium storing instructions that, when executed by a processor, may cause the processor to perform the method of detecting the road line.

In another general aspect, a detection apparatus for detecting a road line includes a processor. The processor is configured to segment a driving image data into a plurality of segmentation areas, determine a candidate vanishing-point area corresponding to a segmentation area of the segmentation areas, extract at least one straight road line from the segmentation area, detect a partial line corresponding to the segmentation area based on whether the at least one straight road line meets the candidate vanishing-point area, detect the road line of the driving image data by connecting partial lines corresponding to the segmentation areas, and indicate the detected road line.

Other features and aspects will be apparent from the following detailed description, the drawings, and the claims.

BRIEF DESCRIPTION OF THE DRAWINGS

FIG. 11 illustrates an example of an apparatus for detecting a road line.

Figure 1A:
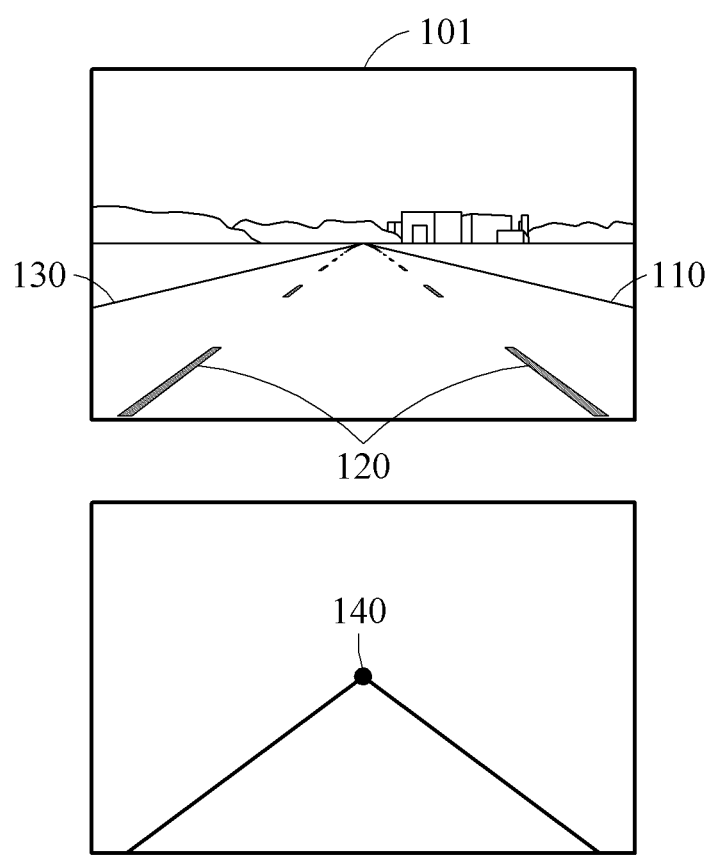
FIGS. 1A and 1B illustrate examples of vanishing points of a straight road line having a straight line and a curved road line having a curved line, respectively.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are thereby understood may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood by one of ordinary skill in the art to which this disclosure pertains and in view of the disclosure of this application. Terms, such as those defined in commonly used dictionaries, are to be interpreted as having a meaning that is consistent with their meaning in the context of the relevant art and the disclosure of this application, and are not to be interpreted in an idealized or overly formal sense unless expressly so defined herein.

Examples set forth hereinafter may include displaying a virtual route or generating visual information to instrument or assist steering of an autonomous vehicle in an augmented reality (AR) navigation system of a smart vehicle. The examples may include interpreting visual information and assisting safe and pleasant driving in an example device including an intelligent system such as a head-up display (HUD) installed for driving assistance or fully autonomous driving of a vehicle. The examples may be representative of, or may be applied to, for example, an autonomous vehicle, an intelligent vehicle, a smart phone, and a mobile device. Hereinafter, the examples will be described in detail with reference to the accompanying drawings, wherein like drawing reference numerals are used for like elements.

Figure 1B:
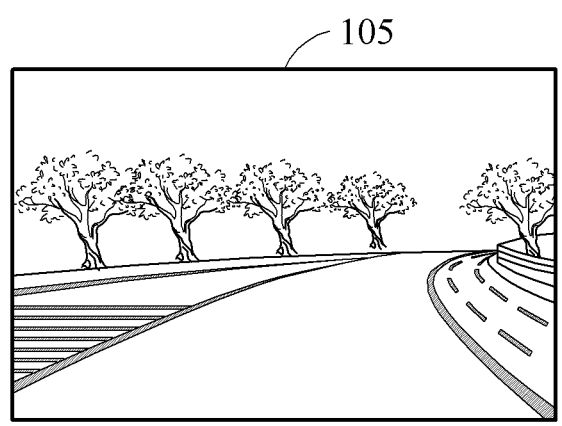
Figure 1B:
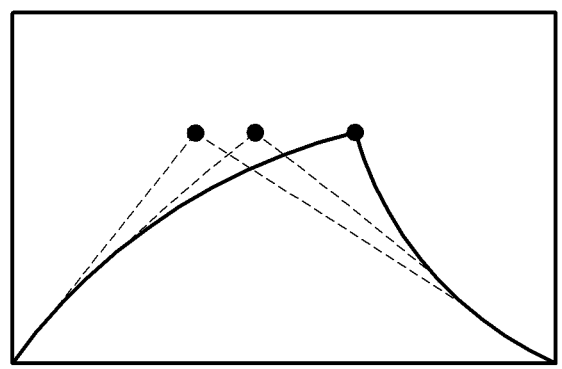

FIGS. 1A and 1B illustrate examples of vanishing points of a straight road line having a straight line and a curved road line having a curved line, respectively. FIG. 1A illustrates a vanishing point 140 detected from a driving image data 101 in a straight road line on a plane road surface. When the lines included in the driving image data 101 of FIG. 1A are straight road lines, the vanishing point 140 is determined at a position at which the straight road lines 110, 120, and 130 extracted in the driving image data 1010 meet at a distance. An apparatus for detecting a road line selects lines included in a single lane, for example, a driving lane from straight road lines passing through the vanishing point 140 by filtering straight road lines based on the vanishing point 140. As such, when the lines are straight road lines rather than curved road lines and the road is on a plane road surface, the straight road lines 110, 120, and 130 are extracted from the entire of the driving image data 101, so that the vanishing point 140 is acquired based on the extracted straight road lines 110, 120, and 130.

FIG. 1B illustrates vanishing points detected from a driving image data 105 in a case in which a road line is a curved road line and/or a road is not on a plane. When the method of detecting the line and the vanishing point described with reference to FIG. 1A is applied to a driving image data 105 in which a line is curved and the road is not flat as illustrated in FIG. 1B, a plurality of vanishing points are extracted that may result in inaccurately detecting the line.

A curved road line may be a plurality of straight lines connected together to form a curve and a curved surface may be a collection of connected planes. Based on such characteristic of a curved road line, a vanishing point and a line may be extracted by assuming that the road is on a plane and extracting one or more of the plurality of straight lines for each segmentation area of the driving image data 105. When a line (a curved road line) is extracted from the driving image data 105 captured in a driving direction of a vehicle, a vanishing point corresponding to each segmentation area of the driving image data 105 (a partial vanishing point) may be acquired instead of detecting a vanishing point with respect to the entire driving image data 105 so that a line corresponding to each segmentation area (a partial line) is detected based on the acquired vanishing point. The use of the term 'may' herein with respect to an example or embodiment, e.g., as to what an example or embodiment may include or implement, means that at least one example or embodiment exists where such a feature is included or implemented while all examples and embodiments are not limited thereto.

When a vanishing point and a line are extracted in a current segmentation area, a spatial similarity with a preceding segmentation area adjacent to the current segmentation area may be used to reduce a search range for extracting the vanishing point and the line. By reducing the search range, a line extraction speed may be improved and a line may be accurately detected irrespective of whether the shape of the line is straight or curved.

Herein, the term "vehicle" refers to a vehicle embodiment that may be driving on a road and includes, for example, an autonomous or automated driving vehicle, and an intelligent or smart vehicle equipped with an advanced driver assistance system (ADAS). The term "road" refers to a way on which vehicles drive, and includes various types of roads such as, for example, a highway, a national road, a local road, an expressway, and a motorway. The road includes one or more lanes. The term "lane" refers to a road space distinguished by lines marked on a surface of the road. A single lane is distinguished by left and right lines or boundary lines thereof. The term "line" refers to a road line and includes various types of lines, for example, solid lines, broken lines, curved road lines, and zigzag lines marked in white, blue or yellow on the surface of the road. The line may correspond to a line on one side that distinguishes a single lane, and may also correspond to a pair of lines, for example, a left line and a right line that distinguish a single lane.

Figure 2:
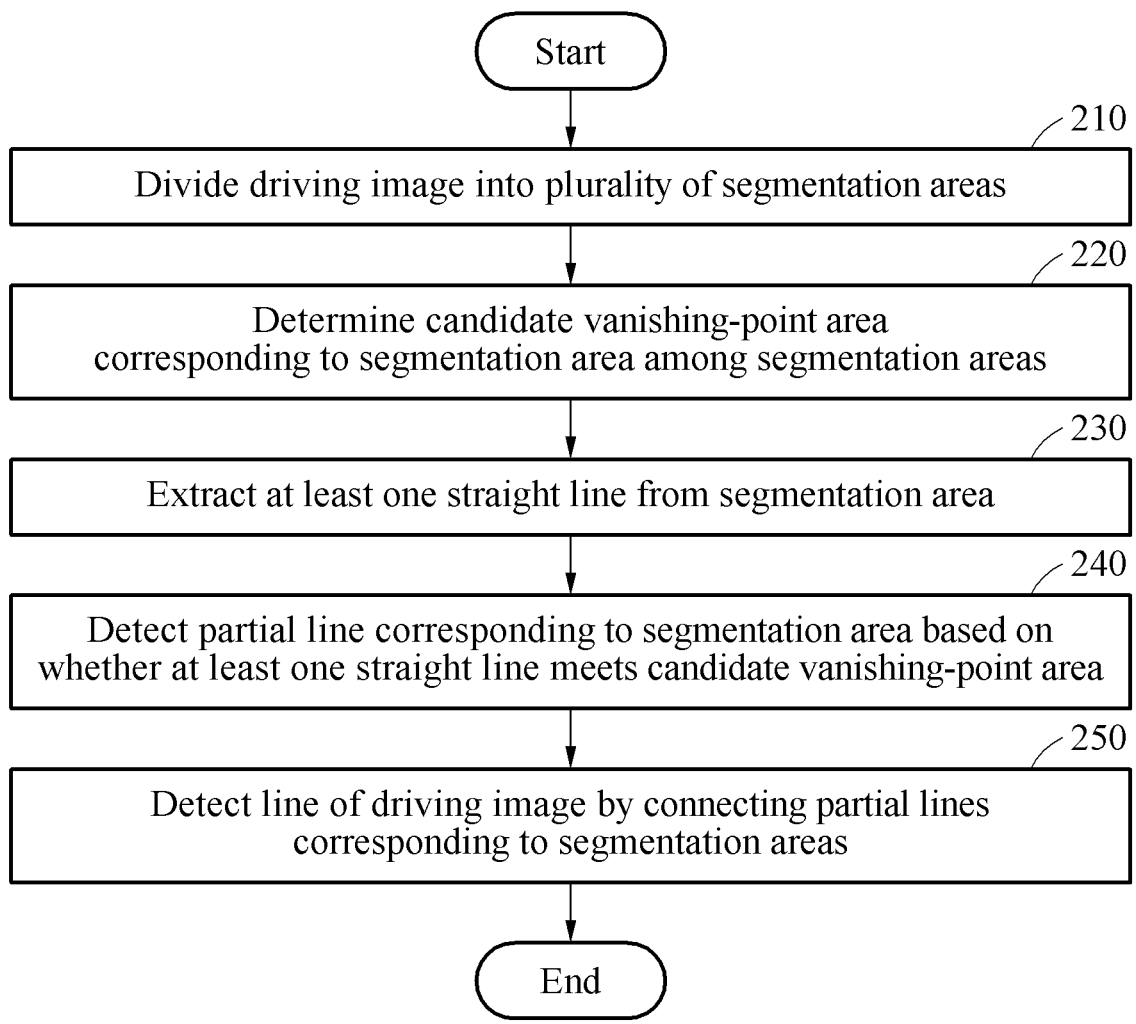
FIG. 2 illustrates an example of a method of detecting a road line.

FIG. 2 illustrates an example of a method of detecting a road line. Referring to FIG. 2, in operation 210, an apparatus for detecting a road line divides, segments, or demarcates a driving image data into a plurality of segmentation areas. Here, the driving image data is, for example, a driving image data acquired using a capturing device mounted on the vehicle. The driving image data may be a 2D image, a 3D volume, or an image sequence.

The driving image data may include a single driving image data and a plurality of driving image data. The driving image data may include a plurality of frames. An example embodiment capturing device may be fixed to a predetermined area such as a windshield, a dashboard, a rear-view mirror, and the like of the vehicle to capture the driving image data in front of the vehicle. The capturing device includes, for example, a vision sensor, an image sensor, or a device performing a similar function. The capturing device may capture a single image and/or an image for each frame depending on a case. The driving image data may also be an image captured by a device other than a detection device. The driving image data may be, for example, the driving image data 105 of FIG. 1B. An example of a method of dividing the driving image data into a plurality of segmentation areas using the apparatus will be further described with reference to FIG. 3.

In operation 220, the apparatus determines a candidate vanishing-point area corresponding to one of the segmentation areas. The apparatus verifies whether the segmentation area is a lowermost segmentation area of the driving image data. The apparatus determines the candidate vanishing-point area based on a verification result. An example of a method of detecting the candidate vanishing-point area using the apparatus will be further described with reference to FIGS. 4 and 5.

In operation 230, the apparatus extracts at least one straight road line from the segmentation area. The apparatus extracts a line detection area corresponding to a portion of the segmentation area and extracts at least one straight road line from the line detection area. An example of a method of extracting at least one straight road line using the apparatus will be further described with reference to FIG. 6.

In operation 240, the apparatus detects a partial line corresponding to the segmentation area based on whether the at least one straight road line meets the candidate vanishing-point area. An example of a method of detecting the partial line using the apparatus will be further described with reference to FIGS. 7 and 8.

In operation 250, the apparatus detects a line of the driving image data by connecting partial lines corresponding to the segmentation areas.

Figure 3:
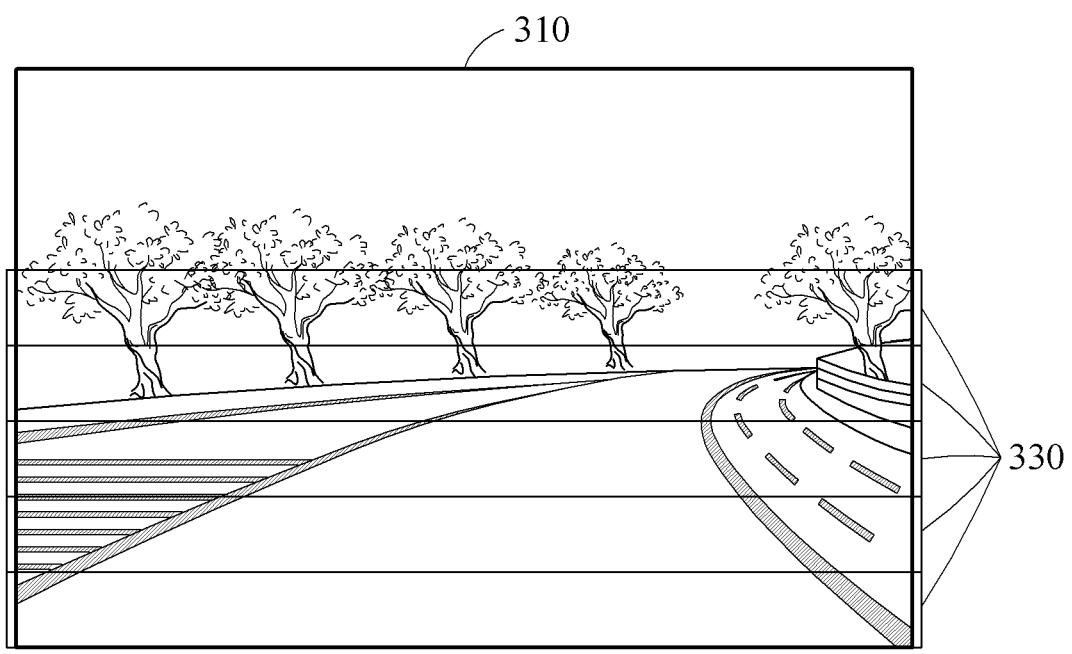
FIG. 3 illustrates an example of a method of dividing a driving image data into a plurality of segmentation areas.

FIG. 3 illustrates an example of a method of dividing a driving image data into a plurality of segmentation areas. FIG. 3 illustrates a driving image data 310 divided into segmentation areas 330 of a driving image data.

An apparatus for detecting a road line horizontally divides the driving image data 310 into the segmentation areas 330 based on horizontal lines. The apparatus divides the driving image data 310 into the segmentation areas 330 horizontally while moving from a lowermost position towards a top of the driving image data 310. For example, the apparatus may divide the driving image data 310 such that each of the segmentation areas 330 has the same (longitudinal) width. Also, the apparatus may divide the driving image data 310 such that the segmentation areas 330 has (longitudinal) widths gradually decreasing in a direction from the lowermost position toward a top of the driving image data 310.

When dividing the driving image data 310, the apparatus may assign an identifier sequentially from the lowermost segmentation area, thereby making the lowest sequential identifier correspond to the lowermost segmentation area. The sequential identifier makes verification of the location of a corresponding segmentation area readily identifiable, for example, in determining whether the corresponding segmentation area is the lowermost segmentation area. In one example, an identifier "0" may be assigned to the lowermost segmentation area and an identifier "1" may be assigned to a subsequent segmentation area adjacent to the lowermost segmentation area.

Figure 4:
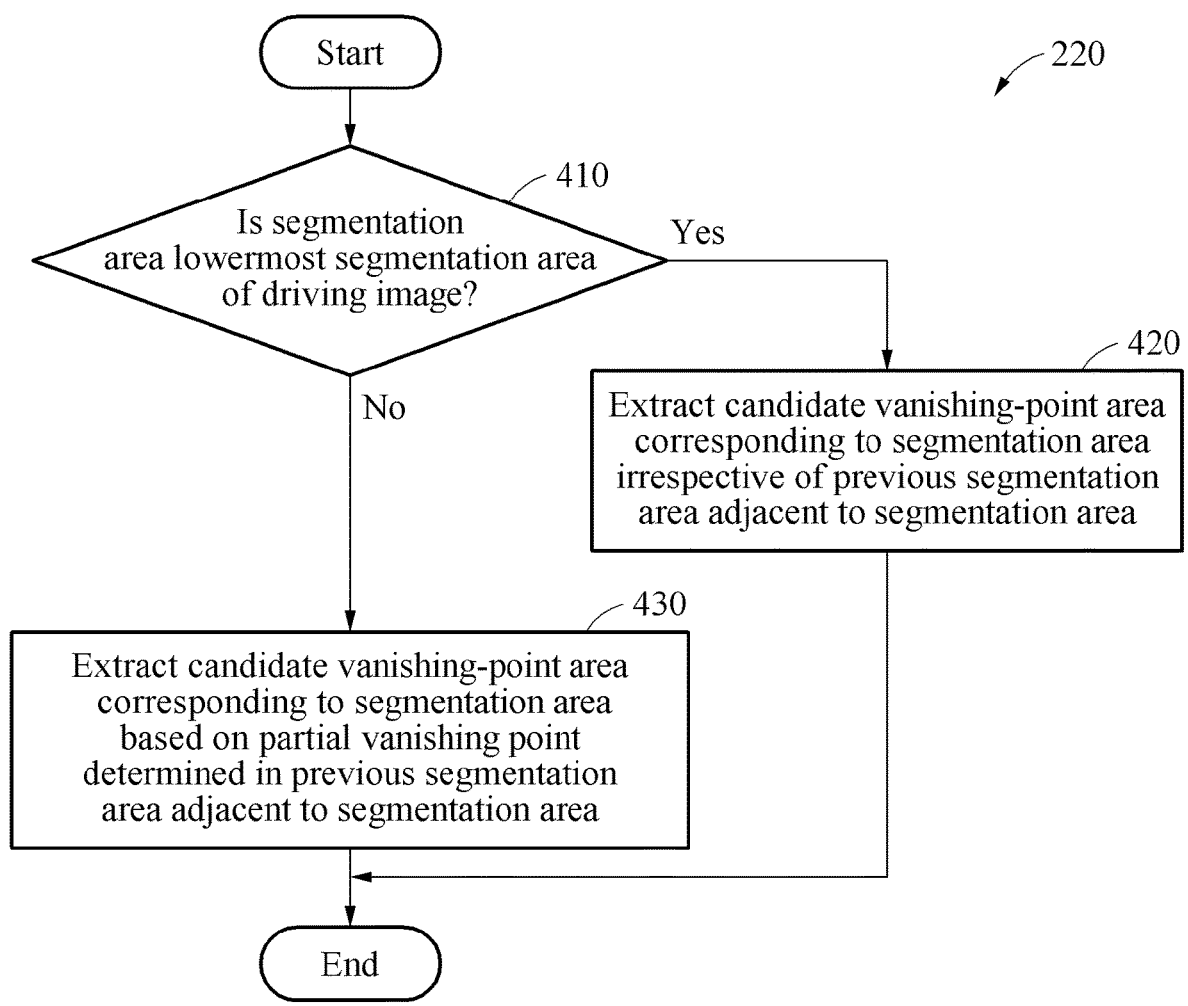
FIG. 4 illustrates an example of a method of determining a candidate vanishing-point area.

FIG. 4 illustrates an example of determining a candidate vanishing-point area. Referring to FIG. 4, in operation 410, an apparatus for detecting a road line verifies whether a segmentation area is a lowermost segmentation area of a driving image data. For example, when identifiers are assigned to segmentation areas, the apparatus verifies whether a segmentation area is the lowermost segmentation area of a driving image data using an identifier, e.g., identifier "0", assigned to the segmentation area. Also, when a driving image data is divided such that (longitudinal) widths of segmentation areas are gradually reduced, the apparatus verifies a segmentation area having the widest (longitudinal) width to be a lowermost segmentation area.

When the segmentation area is verified as the lowermost segmentation area as indicated by a segmentation area 510 identification, e.g., 0 based on the verification result obtained in operation 410, the apparatus extracts a candidate vanishing-point area (for example, a reference numeral 533 of FIG. 5) corresponding to the segmentation area irrespective of a preceding segmentation area adjacent to the segmentation area in operation 420. The candidate vanishing-point area may be understood as, for example, areas having a relatively high probability of including a vanishing point corresponding to a segmentation area of the driving image data. When a segmentation area is the lowermost segmentation area, a preceding segmentation area in a corresponding driving image data (a corresponding frame) may be absent. In this example, the apparatus extracts a candidate vanishing-point area based on the lowermost segmentation area without considering the preceding segmentation area.

Figure 5:
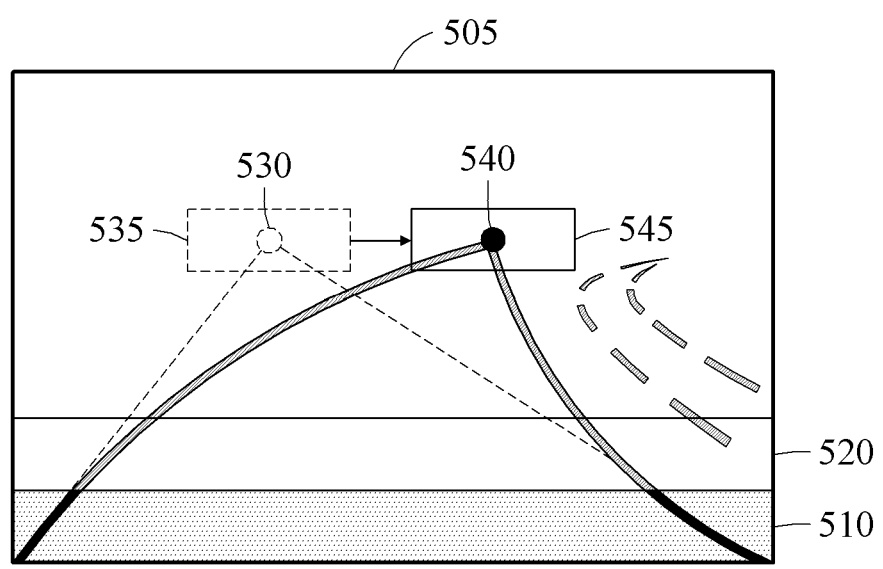
FIG. 5 illustrates an example of determining a candidate vanishing-point area.

When the segmentation area is not verified as the lowermost segmentation area as indicated by a segmentation area 520 identification, e.g., "1," of FIG. 5 based on the verification result obtained in operation 410, in operation 430, the apparatus extracts a candidate vanishing-point area (for example, a bounding box 545 of FIG. 5) corresponding to the segmentation area based on a partial vanishing point (for example, a partial vanishing point 530 of FIG. 5) determined in a preceding segmentation area (for example, the segmentation area "0" 510 of FIG. 5) adjacent to the segmentation area. Here, the partial vanishing point is a vanishing point corresponding to a segmentation area and used for detecting a partial line.

When the segmentation area is not the lowermost segmentation area, the preceding segmentation area in the corresponding driving image data may be present. In this example, the apparatus extracts the candidate vanishing-point area based on the preceding segmentation area and a current segmentation area (the segmentation area). The apparatus defines a bounding box having a predetermined distance from the partial vanishing point determined in the preceding segmentation area and extracts the candidate vanishing-point area by moving the bounding box horizontally based on a driving direction of a vehicle. In this example, the driving direction of the vehicle is acquired using a driving parameter (for example, a steering angle of a wheel). The predetermined distance may be determined relative to the width of the segmentation areas or the width of adjacent segmentation areas. In another example, a predetermined distance is defined from the curvature of the road line. For example, the smaller the curvature of the road line, that is, closer to the straight line, the smaller the size of bounding box gets. Also, the larger the curvature of the road line, the larger the size of bounding box gets.

The apparatus extracts the candidate vanishing-point area corresponding to the segmentation area based on the partial vanishing point determined in the preceding segmentation area and the driving parameter corresponding to the driving image data in operation 430. The apparatus extracts the candidate vanishing-point area from a right side of the partial vanishing point when a steering angle of the wheel is rightward, and extracts the candidate vanishing-point area from a left side of the partial vanishing point when a steering angle of the wheel is leftward.

When a road driving image data is used, the apparatus extracts the candidate vanishing-point area corresponding to the segmentation area using information acquired from a preceding frame of the road driving image data (for example, line information extracted left and right lowermost areas of the preceding frame) even if the segmentation area is verified as the lowermost segmentation area in operation 410.

FIG. 5 illustrates an example of determining a candidate vanishing-point area. Each of the plurality of vanishing points may be based on tangents of the curved road lines. FIG. 5 illustrates a segmentation area "0" 510 and a segmentation area "1" 520 of a driving image data 505, a partial vanishing point 530 corresponding to the segmentation area 0 510, a partial vanishing point 540 corresponding to the segmentation area 1 520, a bounding box 535 corresponding to the segmentation area 0 510, and a bounding box 545 corresponding to the segmentation area 1 520.

As described above, a vanishing point and a line may be extracted in a current segmentation area using a vanishing point and a line extracted in a preceding segmentation area.

An apparatus for detecting a road line extracts a vanishing point and a line while sequentially moving from a lowermost segmentation area to a top of the driving image data 505. For example, the apparatus extracts a vanishing point and a line of the segmentation area "1" 520 after a vanishing point and a line of the segmentation area "0" 510 are extracted.

The apparatus defines the bounding box 535 having a predetermined distance from the partial vanishing point 530 determined in the segmentation area "0" 510 corresponding to the preceding segmentation area. The apparatus extracts a candidate vanishing-point area corresponding to the segmentation area "1" 520 using the bounding box 535. Since vanishing points of adjacent segmentation areas are present within a predetermined distance, the apparatus moves the bounding box 535 rightward based on the steered wheel direction of a vehicle as indicated by the bounding box 545. The apparatus determines an area including the bounding box 545 or the bounding box 545 to be the candidate vanishing-point area corresponding to the segmentation area "1" 520.

Figure 6:
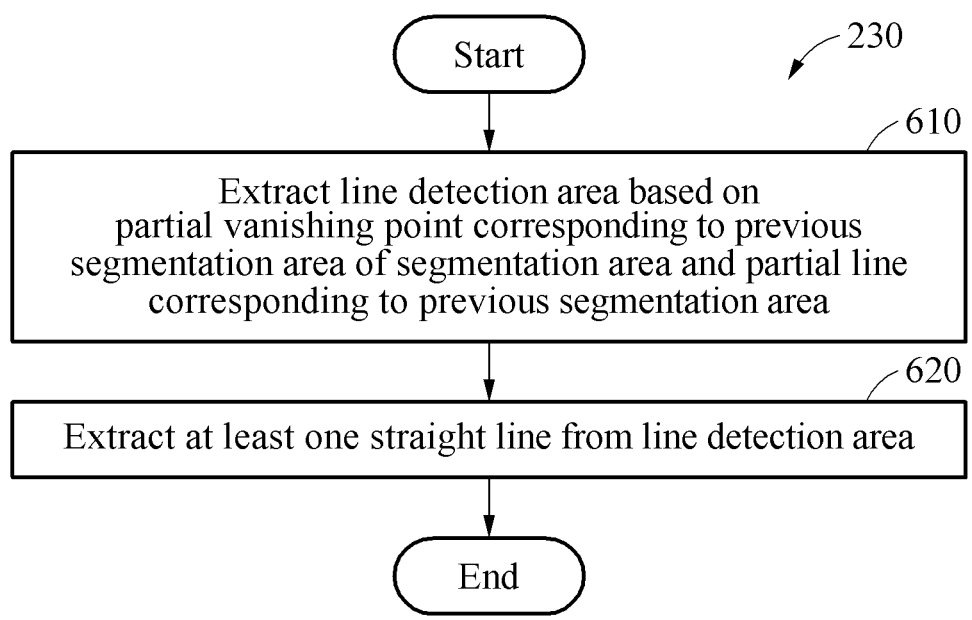
FIG. 6 illustrates an example of a method of extracting at least one straight road line.

FIG. 6 illustrates an example of a method of extracting at least one straight road line. For example, a line (a partial line) may be continuous in adjacent segmentation areas. An apparatus for detecting a road line defines a line from a line detection area of a current segmentation area by filtering a straight road line in the current segmentation area based on a partial line corresponding to a preceding segmentation area.

Referring to FIG. 6, in operation 610, the apparatus extracts a line detection area based on a partial vanishing point corresponding to a preceding segmentation area of a segmentation area and a partial line corresponding to the preceding segmentation area. The line detection area corresponds to an area in which a line is predicted to be present or a line is likely to be detected in the segmentation area. Whether the line is present is verified using the partial vanishing point corresponding to the preceding segmentation area and the partial line corresponding to the preceding segmentation area. As described above, since the line has a continuity, a partial line of a corresponding segmentation area may be present in a location adjacent to the partial line of the preceding segmentation area. Also, a partial vanishing point of the corresponding partial line is present at a location changed in the steered wheel direction of a vehicle based on the partial vanishing point corresponding to the preceding segmentation area. The apparatus extracts, to be the line detection area, a predetermined area adjacent to the preceding segmentation area in the segmentation area based on the partial vanishing point at the location changed within a predetermined distance from the partial vanishing point corresponding to the preceding segmentation area.

In operation 620, the apparatus extracts at least one straight road line from the line detection area. The apparatus extracts at least one straight road line passing through the line detection area. In this example, the at least one straight road line may include lines corresponding to a portion of various road markings such as a curb, a neighboring line, and a stop line in addition to the line connected to the partial line corresponding to the preceding segmentation area (for example, the partial line corresponding to the segmentation area). The apparatus extracts at least one straight road line passing through the candidate vanishing-point area among lines passing through the adjacent area based on the line extracted from the preceding segmentation area.

Figure 7:
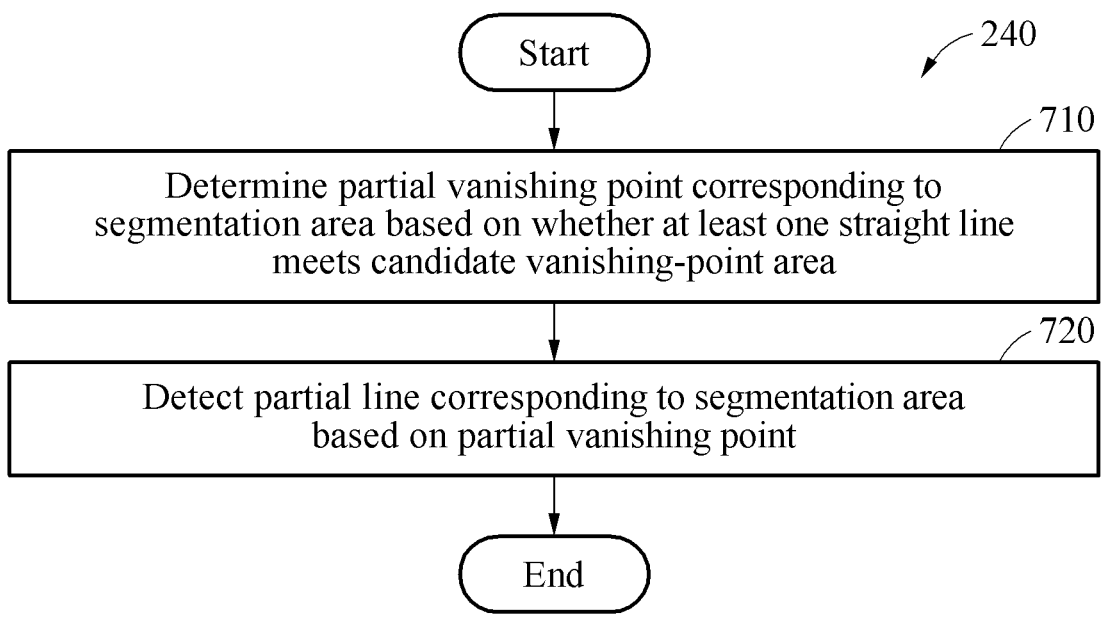
FIG. 7 illustrates an example of a method of detecting a partial line.

FIG. 7 illustrates an example of a method of detecting a partial line. Referring to FIG. 7, in operation 710, an apparatus for detecting a road line determines a partial vanishing point corresponding to a segmentation area based on whether at least one straight road line extracted from a line detection area meets a candidate vanishing-point area. In operation 710, the apparatus determines the partial vanishing point corresponding to the segmentation area based on intersection points between straight road lines in the candidate vanishing-point area.

In operation 720, the apparatus detects a partial line corresponding to the segmentation area based on the partial vanishing point. In operation 720, the apparatus detects straight road line(s) passing through the partial vanishing point (or an area adjacent to the partial vanishing point) among the at least one straight road line to be partial line(s). Also, the apparatus detects the partial line(s) corresponding to the segmentation area based on whether the partial line(s) is a continuation of partial line(s) corresponding to a preceding segmentation area of the segmentation area.

Figure 8:
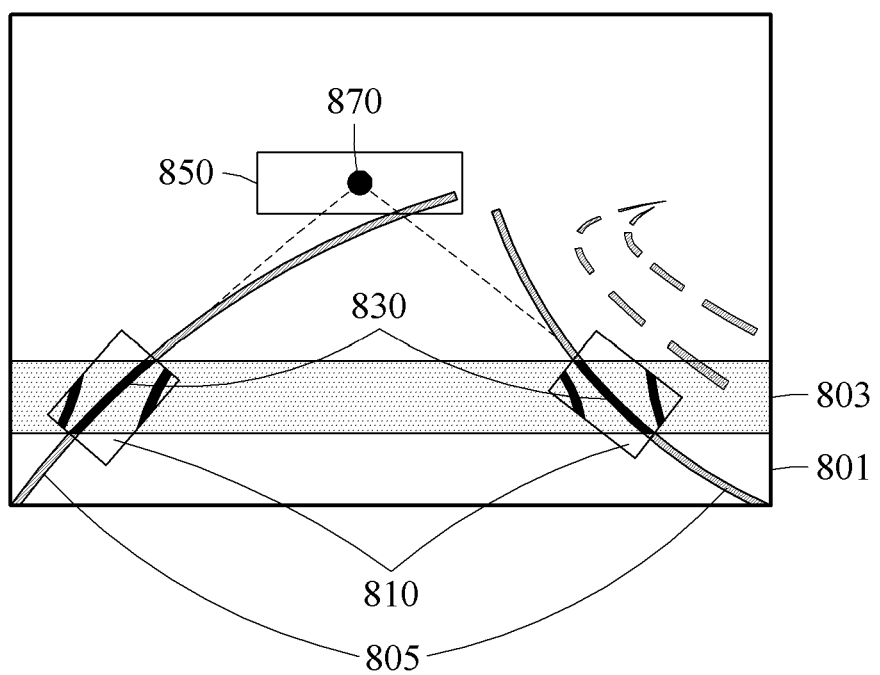
FIG. 8 illustrates an example of a method of detecting a partial line.

FIG. 8 illustrates an example of a method of detecting a partial line. FIG. 8 illustrates a preceding segmentation area 801, a current segmentation area 803, line(s) 805 corresponding to the preceding segmentation area 801, a line detection area 810, a partial line 830, a candidate vanishing-point area 850, and a partial vanishing point 870.

The preceding segmentation area 801 and the current segmentation area 803 are segmentation areas neighboring each other. The line detection area 810 is a line detection area corresponding to the current segmentation area 803. The partial line 830 is a partial line corresponding to the current segmentation area 803. The candidate vanishing-point area 850 and the partial vanishing point 870 are a candidate vanishing-point area and a partial vanishing point corresponding to the current segmentation area 803.

An apparatus for detecting a road line verifies whether (an extending line of) straight road line(s) 830 extracted from the line detection area 810 meets the candidate vanishing-point area 850. As illustrated in FIG. 8, when (an extending line of) the straight road line 830 meets the candidate vanishing-point area 850, the apparatus determines an intersection point between (an extending line of) the straight road line(s) 830 and the candidate vanishing-point area 850 to be the partial vanishing point 870 corresponding to the segmentation area 803.

The apparatus detects the straight road line(s) 830 as partial line(s) corresponding to the segmentation area 803 based on the partial vanishing point 870. In this example, the apparatus detects the partial line based on whether partial line(s) (the straight road line 830) corresponding to the segmentation area 803 is a continuation of the partial line(s) 805 corresponding to the preceding segmentation area 801. In the example of FIG. 8, since the partial line (the straight road line 830) is a continuation of the partial line(s) 805, the apparatus detects the partial line (the straight road line 830) as the partial line corresponding to the segmentation area 803.

By repeating the aforementioned process, the apparatus extracts partial lines corresponding to all of the segmentation areas and connects the partial lines, thereby defining a single line corresponding to the entire area of the driving image data.

Figure 9:
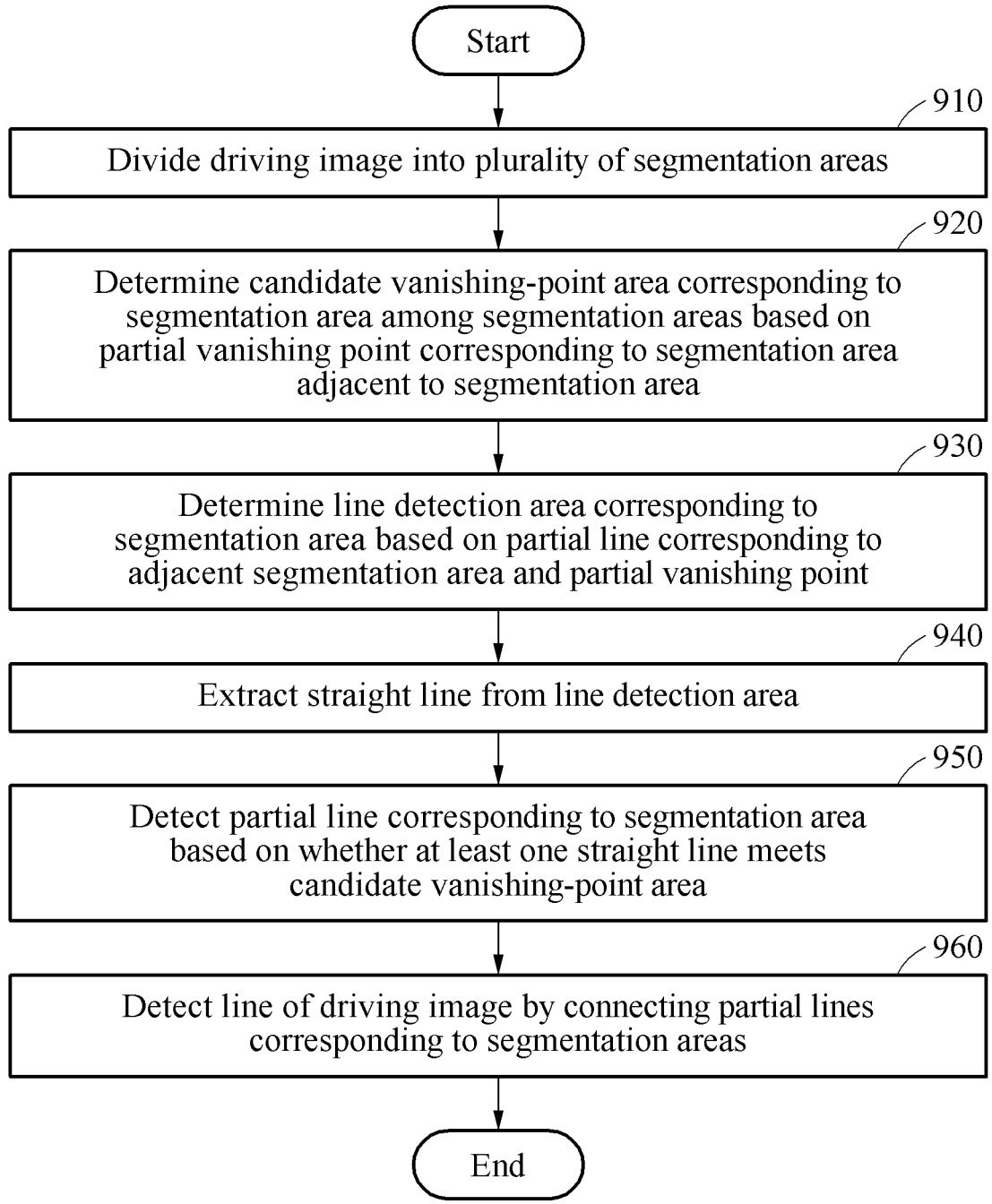
FIG. 9 illustrates an example of a method of detecting a road line.

FIG. 9 illustrates an example of a method of detecting a road line. Referring to FIG. 9, in operation 910, an apparatus for detecting a road line divides a driving image data into a plurality of segmentation areas.

In operation 920, the apparatus determines a candidate vanishing-point area corresponding to a segmentation area among the segmentation areas based on a partial vanishing point corresponding to a segmentation area adjacent to the segmentation area. The apparatus extracts a candidate vanishing-point area corresponding to the segmentation area based on the partial vanishing point corresponding to the adjacent segmentation area and a driving parameter corresponding to the driving image data.

In operation 930, the apparatus determines a line detection area corresponding to the segmentation area based on a partial line corresponding to the adjacent segmentation area and the partial vanishing point.

In operation 940, the apparatus extracts at least one straight road line from the line detection area. In operation 940, the apparatus extracts the line detection area from the segmentation area. In this example, the apparatus extracts the line detection area based on the partial vanishing point corresponding to the adjacent segmentation area and a partial line corresponding to the adjacent segmentation area. Thereafter, the apparatus extracts at least one straight road line from the line detection area.

In operation 950, the apparatus detects a partial line corresponding to the segmentation area based on whether the at least one straight road line meets the candidate vanishing-point area. In operation 950, the apparatus determines a partial vanishing point corresponding to the segmentation area based on whether the at least one straight road line meets the candidate vanishing-point area. The apparatus detects the partial line corresponding to the segmentation area based on the partial vanishing point. In this example, the apparatus detects a straight road line passing through the partial vanishing point among the at least one straight road line as the partial line. For example, the apparatus detects the partial line corresponding to the segmentation area based on whether the partial line is a continuation of the partial line corresponding to the adjacent segmentation area.

In operation 960, the apparatus detects a line of the driving image data by connecting the partial lines corresponding to the segmentation areas.

Figure 10:
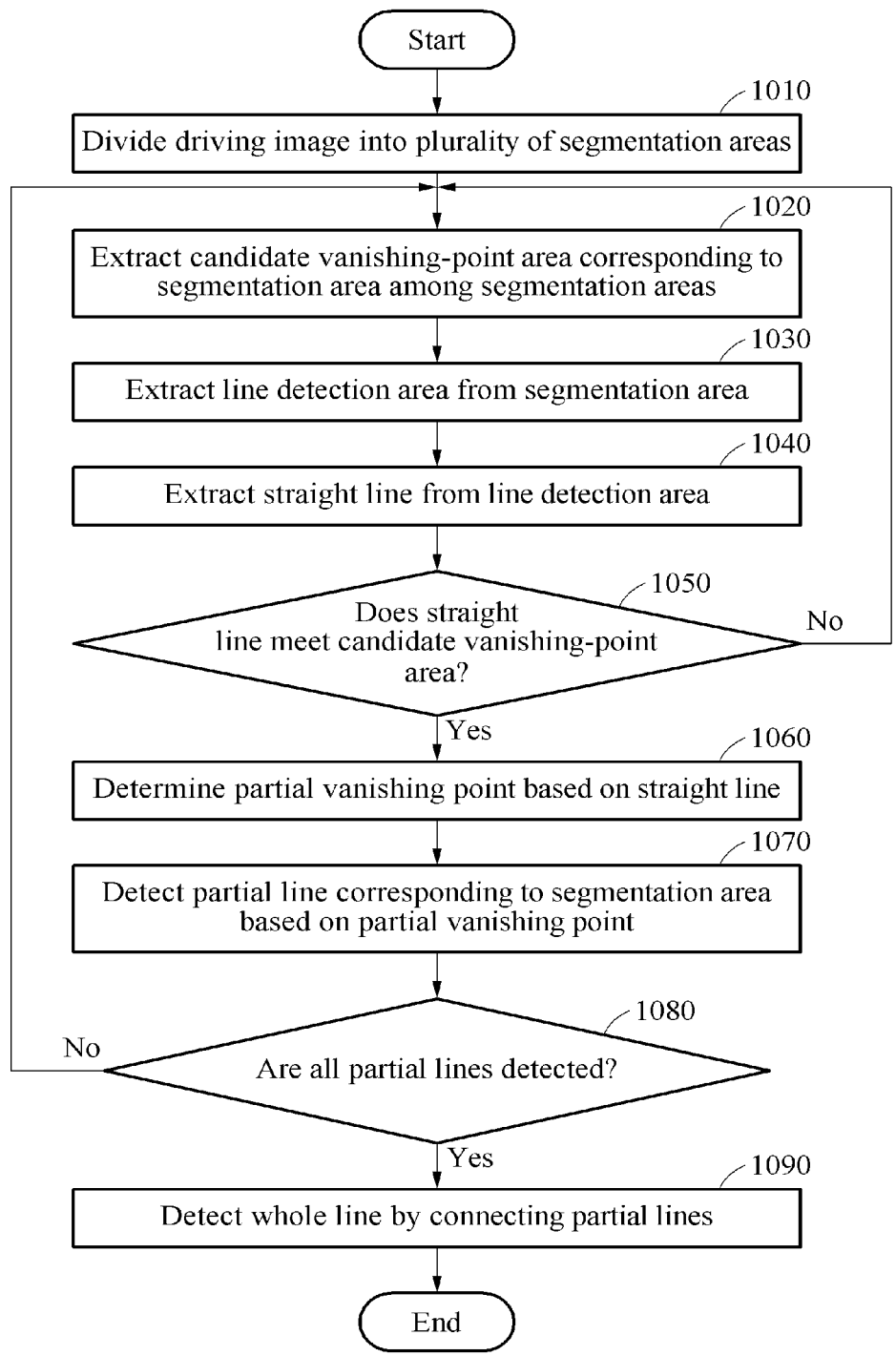
FIG. 10 illustrates an example of a method of detecting a road line.

FIG. 10 illustrates an example of a method of detecting a road line. Referring to FIG. 10, in operation 1010, an apparatus for detecting a road line divides a driving image data into a plurality of segmentation areas.

In operation 1020, the apparatus extracts a candidate vanishing-point area corresponding to a segmentation area among the segmentation areas. In operation 1030, the apparatus extracts a line detection area from the segmentation area.

In operation 1040, the apparatus extracts a straight road line from the line detection area. The apparatus determines the candidate vanishing-point area corresponding to the segmentation area based on whether the straight road line, for example, a line extending from the straight road line meets the candidate vanishing-point area.

In operation 1050, the apparatus verifies whether the straight road line, for example, the line extending from the straight road line meets the candidate vanishing-point area. When it is verified that the straight road line does not meet the candidate vanishing-point area in operation 1050, the apparatus extracts a candidate vanishing-point area corresponding to another segmentation area in operation 1020.

When it is verified that the straight road line meets the candidate vanishing-point area in operation 1050, the apparatus determines a partial vanishing point based on the straight road line in operation 1060. In operation 1070, the apparatus detects a partial line corresponding to the segmentation area based on the partial vanishing point.

In operation 1080, the apparatus verifies whether all partial lines corresponding to the driving area are detected after operation 1070 is performed. When it is verified that not all of the partial lines are detected in operation 1080, the apparatus extracts a candidate vanishing-point area corresponding to another segmentation area in operation 1020.

When it is verified that all of the partial lines are detected in operation 1080, the apparatus detects a whole line of the driving image data by connecting the partial lines detected to correspond to the segmentation areas in operation 1090.

FIG. 11 illustrates an example of an apparatus or system for detecting a road line. Referring to FIG. 11, an apparatus 1100 detecting a road line may include sensors 1110 and a processor 1130. The apparatus 1100 may also include a memory 1150, a communication interface 1170, and a display 1190. The sensors 1110, the processor 1130, the memory 1150, the communication interface 1170, and the display 1190 may communicate with one another through a communication bus 1105.

The sensors 1110 include, for example, an image sensor, an accelerometer sensor, a compass sensor, a GPS sensor, a gyro sensor, an odometer, and a geomagnetic sensor. The sensors 1110 acquire positioning information indicating a location of a vehicle. Also, the sensors 1110 captures a driving image data of the vehicle. As noted above, the apparatus or system is also representative of a vehicle, in an example.

The processor 1130 divides a driving image data into a plurality of segmentation areas and determines a candidate vanishing-point area corresponding to a segmentation area among the segmentation areas. The processor 1130 extracts at least one straight road line from the segmentation area. The processor 1130 detects a partial line corresponding to the segmentation area based on whether the at least one straight road line meets the candidate vanishing-point area. The processor 1130 detects a line of the driving image data by connecting partial lines corresponding to the segmentation areas.

The apparatus 1100 receives sensing information including a driving image data through the communication interface 1170. In an example, the communication interface 1170 receives sensing information including a driving image data from other sensors outside the apparatus 1100.

The processor 1130 outputs a line of the driving image data using the communication interface 1170 and/or the display 1190. Also, the processor 1130 performs at least one of the methods described with reference to FIGS. 1 through 10 or an algorithm corresponding to at least one of the methods.

With respect to FIG. 11, above discussed apparatus for detecting a road line may include one or more processors, or representative of the corresponding operations being respectively implemented in various combinations by two or more processors. For example, each such one or more processors may be implemented through hardware only, e.g., through specialized circuitry, or through a combination of such hardware and instructions, such that when a corresponding processor executes such instructions, the processor is caused to perform the described operations.

The display 1190 indicates includes displaying a line detected by the processor 1130 by indicating a corresponding virtual route or visual information configured to assist steering of an autonomous vehicle, e.g., in an augmented reality (AR) navigation system or a smart vehicle example. Such indications may help the user to interpret visual information and/or provide assist safe and pleasant driving in an example device as or including an intelligent system such as an included head-up display (HUD), e.g., for driving assistance or in the fully autonomous driving embodiment of the vehicle.

The term "processor," as used herein, is a hardware-implemented data processing device having a circuit that is physically structured to execute desired operations. For example, the desired operations include code or instructions included in a program. The hardware-implemented data processing device includes, but is not limited to, for example, a microprocessor, a central processing unit (CPU), a processor core, a multi-core processor, a multiprocessor, an application-specific integrated circuit (ASIC), and a field-programmable gate array (FPGA).

The processor 1130 may execute a program and control the apparatus 1100. Codes or instructions of the program executed by the processor 1130 are stored in the memory 1150.

The memory 1150 stores the driving image data and the line detected from the driving image data by the processor 1130. The memory 1150 stores various information generated during a processing operation of the processor 1130. Also, the memory 1150 stores a variety of data and programs. The memory 1150 includes a volatile memory or a non-volatile memory. The memory 1150 includes a large-capacity storage medium such as a hard disk to store the variety of data.

The display 1190 displays the line determined by the processor 1130 and the map information separately or together.

The apparatus 1100, sensors 1110, processor 1130, memory 1150, communication interface 1170, and display 1190 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented method of detecting a road line, comprising:
    segmenting a captured driving image data into a plurality of segmentation areas;
    determining a candidate vanishing-point area corresponding to a segmentation area of the segmentation areas;
    extracting at least one straight road line from the segmentation area;
    detecting a partial line corresponding to the segmentation area based on whether the at least one straight road line meets the candidate vanishing-point area; and
    detecting the road line of the driving image data by connecting partial lines corresponding to the segmentation areas,
    wherein the determining of the candidate vanishing-point area comprises:
    verifying whether the segmentation area is a lowermost segmentation area of the driving image data; and
    extracting, when the segmentation area is not the lowermost segmentation area, a candidate vanishing-point area corresponding to the segmentation area based on a partial vanishing point determined in a preceding segmentation area adjacent to the segmentation area.

2. The method of claim 1, further comprising indicating the detected road line.

3. The method of claim 1, further comprising:
    extracting, when the segmentation area is the lowermost segmentation area, a candidate vanishing-point area corresponding to the segmentation area irrespective of a preceding segmentation area adjacent to the segmentation area.

4. The method of claim 1, wherein the extracting of the candidate vanishing-point area comprises:
    defining a bounding box having a predetermined distance from the partial vanishing point determined in the preceding segmentation area; and
    extracting the candidate vanishing-point area using the bounding box.

5. The method of claim 1, wherein the extracting of the candidate vanishing-point area comprises:
    extracting a candidate vanishing-point area corresponding to the segmentation area based on the partial vanishing point determined in the preceding segmentation area and a driving parameter corresponding to the driving image data.

6. The method of claim 1, wherein the segmenting comprises:
    segmenting the driving image data into the segmentation areas horizontally while moving from a lowermost position toward a top of the driving image data.

7. The method of claim 1, wherein the extracting of the at least one straight road line comprises:
    extracting a line detection area from the segmentation area; and
    extracting the at least one straight road line from the line detection area.

8. The method of claim 7, wherein the extracting of the line detection area comprises:
    extracting the line detection area based on a partial vanishing point corresponding to a preceding segmentation area of the segmentation area and a partial line corresponding to the preceding segmentation area.

9. The method of claim 1, wherein the detecting of the partial line comprises:
    determining a partial vanishing point corresponding to the segmentation area based on whether the at least one straight road line meets the candidate vanishing-point area; and
    detecting a partial line corresponding to the segmentation area based on the partial vanishing point.

10. The method of claim 9, wherein the detecting of the partial line comprises:
    detecting a straight road line passing through the partial vanishing point among the at least one straight road line as the partial line.

11. The method of claim 9, wherein the detecting of the partial line comprises:
    detecting the partial line corresponding to the segmentation area based on whether the partial line is a continuation of a partial line corresponding to a preceding segmentation area of the segmentation area.

12. A processor-implemented method of detecting a road line, comprising:
    segmenting a captured driving image data into a plurality of segmentation areas;
    determining a candidate vanishing-point area corresponding to a segmentation area of the segmentation areas based on a partial vanishing point corresponding to a segmentation area adjacent to the segmentation area;
    determining a line detection area corresponding to the segmentation area based on a partial line corresponding to the adjacent segmentation area and the partial vanishing point corresponding to the segmentation area adjacent to the segmentation area;
    extracting at least one straight road line from the line detection area;
    determining a partial vanishing point corresponding to the segmentation area based on whether the at least one straight road line meets the candidate vanishing-point area;
    detecting a partial line corresponding to the segmentation area based on the determined partial vanishing point corresponding to the segmentation area; and
    detecting a road line of the driving image data by connecting partial lines corresponding to the segmentation areas.

13. The method of claim 12, wherein the determining of the candidate vanishing-point area comprises:
    extracting a candidate vanishing-point area corresponding to the segmentation area based on the partial vanishing point corresponding to the adjacent segmentation area and a driving parameter corresponding to the driving image data.

14. The method of claim 12, wherein the extracting of the at least one straight road line comprises:
- extracting the line detection area from the segmentation area; and
- extracting the at least one straight road line from the line detection area.

15. The method of claim 14, wherein the extracting of the line detection area comprises:
- extracting the line detection area based on the partial vanishing point corresponding to the adjacent segmentation area and a partial line corresponding to the adjacent segmentation area.

16. The method of claim 12, wherein the detecting of the partial line comprises:
- detecting a straight road line passing through the partial vanishing point corresponding to the segmentation area among the at least one straight road line as the partial line.

17. The method of claim 12, wherein the detecting of the partial line comprises:
- detecting the partial line corresponding to the segmentation area based on whether the partial line corresponding to the segmentation area is a continuation of a partial line corresponding to a preceding segmentation area.

18. A non-transitory computer-readable storage medium storing instructions that, when executed by a processor, cause the processor to perform the method of claim 1.

19. A detection apparatus for detecting a road line, comprising:
- a processor configured to:
- segment a captured driving image data into a plurality of segmentation areas;
- determine a candidate vanishing-point area corresponding to a segmentation area of the segmentation areas by:
  - a verification of whether the segmentation area is a lowermost segmentation area of the driving image data;
  - an extraction, when the segmentation area is the lowermost segmentation area, of a candidate vanishing-point area corresponding to the segmentation area irrespective of a preceding segmentation area adjacent to the segmentation area; and
  - an extracting, when the segmentation area is not the lowermost segmentation area, of a candidate vanishing-point area corresponding to the segmentation area based on a partial vanishing point determined in a preceding segmentation area adjacent to the segmentation area;
- extract at least one straight road line from the segmentation area;
- detect a partial line corresponding to the segmentation area based on whether the at least one straight road line meets the candidate vanishing-point area; and
- detect the road line of the driving image data by connecting partial lines corresponding to the segmentation areas.

* * * * *